US 6,598,467 B1

United States Patent
Schöggl et al.

(10) Patent No.: US 6,598,467 B1
(45) Date of Patent: Jul. 29, 2003

(54) METHOD FOR ANALYZING THE DRIVING BEHAVIOR OF MOTOR VEHICLES

(75) Inventors: Peter Schöggl, Seiersberg (AT); Helmut List, Graz (AT)

(73) Assignee: AVL List GmbH, Graz (AT)

( * ) Notice: Subject to any disclaimer, the term of this patent is extended or adjusted under 35 U.S.C. 154(b) by 113 days.

(21) Appl. No.: 09/661,380

(22) Filed: Sep. 13, 2000

(30) Foreign Application Priority Data

Sep. 13, 1999 (AT) ............................................. 621/99 U

(51) Int. Cl.[7] .................................................. G01L 3/26
(52) U.S. Cl. ...................................................... 73/117.3
(58) Field of Search ........................ 73/117, 116, 118.1; 280/772

(56) References Cited

U.S. PATENT DOCUMENTS 4,413,522 A  11/1983  Leatherwood et al.

FOREIGN PATENT DOCUMENTS

DE  3943007  7/1990
EP  846945  7/1999

*Primary Examiner*—Edward Lefkowitz
*Assistant Examiner*—Maurice Stevens
(74) *Attorney, Agent, or Firm*—Dykema Gossett PLLC

(57) ABSTRACT

The present invention relates to a method for analyzing the driving behavior of motor vehicles on a roller type test stand, with the following steps:
- performance of a predetermined operating cycle in a motor vehicle which is disposed on a roller type test stand;
- determination of a first longitudinal acceleration signal from a speed signal which is tapped from the power train of the motor vehicle or the roller type test stand;
- determination of a second longitudinal acceleration signal by an acceleration sensor attached to the motor vehicle;
- superposition of the first and second longitudinal acceleration signal into a composite signal;
- determination of a parameter representative of the driveability of the motor vehicle from the composite signal.

11 Claims, 1 Drawing Sheet

METHOD FOR ANALYZING THE DRIVING BEHAVIOR OF MOTOR VEHICLES

BACKGROUND OF THE INVENTION

The present invention relates to a method for analyzing the driving behavior of motor vehicles on a roller type test stand.

The target variables in the development and optimization of the drive system of motor vehicles are emission behavior, consumption, performance and driveability. In general, driveability is a subjective concept, in particular concerning the behavior of a vehicle in transient operational states as assessed by the driver. When the accelerator pedal of a car is depressed rapidly, the driver will feel more comfortable if acceleration sets in quickly and is jerk-free. The same is true for other transient operating conditions, such as a sudden shift into overrun or return from overrun. Any delays, irregularities or variations in vehicle response as a result of driver-induced changes are usually felt to be irritating. Examples include fore and aft oscillations (surge), delays in response, oscillations in engine speed or tractive power. Positive feelings are evoked by prompt accelerator response, smooth engine power, or quiet and stable idling. A vehicle's driveability is significantly influenced by the engine management, but also by engine suspension and design of the power train as a whole. In view of current attempts to optimize fuel consumption and exhaust emissions by influencing engine management, maintaining or increasing driveabuilty must be considered as a further target variable.

It is a problem in this context that objective and reproducible criteria in determining a vehicle's driveability are hard to be found in practice, compared with the determination of fuel consumption or exhaust emissions. A further disadvantage is that in the early stages of vehicle development test vehicles are not usually available, so that transient engine management functions must be optimized on a dynamic test stand. Such tests have not been successful so far in producing reliable ratings of a vehicle's driveability.

DESCRIPTION OF PRIOR ART

In EP 0 846 945 A of the applicant, methods and apparatuses are described that enable the highest possible objective determination of the driveability. The vehicle is subjected in real driving operation to a large number of measurements, with the measurement of the longitudinal acceleration being of particular relevance because surge oscillations have a relevant influence on the driveability. It is also described in said printed publication how a forecast can be made on a dynamic test stand when there is a precise simulation model of the vehicle which reflects the power train in a detailed manner in particular. The production of such a simulation model is very complex, however.

Although the recording of data for determining the driveability in driving operations is easily possible, it is still desirable in many cases to simultaneously perform further measures such as measurements of noise or exhaust gas. In a number of cases the vehicle to be examined is moreover not in a condition that would simply allow driving on an open road. In such cases it is desirable to have the possibility to examine the driveability on a roller type test stand.

With the known methods it is not possible to perform a determination of the driveability, because signals on the longitudinal acceleration in particular are not available. However, they are relevant in the determination of the driveability. The production of a sufficiently precise model of the vehicle situated on the roller type test stand is very difficult, because it is also necessary to consider the dynamics of the test stand and the coupling of the vehicle with the rollers.

SUMMARY OF THE INVENTION

It is the object of the present invention to provide a simple and reliable method for determining the driveability of a motor vehicle which can be used on a roller type test stand.

The method is provided in accordance with the invention with the following steps:

Performance of a predetermined operating cycle on a motor vehicle located on a roller type test stand;

determination of a first longitudinal acceleration signal from a speed signal which is tapped from the power train of the motor vehicle or the roller type test stand;

determination of a second longitudinal acceleration signal by an acceleration sensor fastened to the vehicle;

superposition of the first and second longitudinal acceleration signal into a composite signal;

determination of a parameter from the composite signal which is representative of the driveability of the motor vehicle.

The relevant aspect of the invention is that the composite signal determined at the test stand by calculation can be used in the determination of the driveability in an analogous manner as the longitudinal acceleration determined in real driving operation. Methods can therefore be used as are described in EP 0 846 945 A insofar as the same relate to the observation of the real vehicle.

As in known methods, the vehicle is subjected to a test cycle, with trigger conditions corresponding to typical driving situations being acquired through the observation of different measured variables. By analyzing the measured variables during the occurrence of the trigger conditions, parameters can be determined which allow drawing conclusions on the driveability of the vehicle. Such methods are described in detail in EP 846 945 A. The present invention now also allows performing such methods on a vehicle which is located on a roller type test stand. This helps achieving a simplification of the test procedure and simultaneously performing additional measurements with simple means which relate to the emission of exhaust gases or the noise development for example.

It is particularly favorable if the first longitudinal acceleration signal is derived from a speed signal by differentiation. The engine speed can be used in this connection for example as the speed signal. The theoretical speed of the vehicle can be calculated by considering the transmission gear ratio in the respectively engaged gear, the transmission ratio of the driving axle and the tread of the tires. As an alternative, the directly determined speed of a wheel can be converted into a speed value, or said value is calculated from the speed of the rollers of the test stand. The theoretical longitudinal acceleration is obtained by the differentiation of the speed. This variable is not suitable for determining the driveability, because the characteristic surge frequencies are represented in a highly distorted way. A useful value is only obtained by the superposition in accordance with the invention with a longitudinal acceleration signal as tapped from the vehicle per se.

A distortion by artifacts can be minimized especially in such a way that the first longitudinal acceleration signal is subjected to a low-pass filtering. A cut-off frequency of between 1 and 2 Hz is suitable for most applications.

It is similarly favorable when the second longitudinal acceleration signal is subjected to a high-pass filtering, with the cut-off frequency being 0.5 to 1.5 Hz. It is favorable when the cut-off frequency of the high-pass filter lies slightly below the one of the low-pass filter. These filterings are adjusted to one another in such a way that the cut-off frequency of the filter is set to a value which ensures that the low-frequency share is taken to such an extent from the first longitudinal acceleration signal as it would correspond to the actual longitudinal acceleration on the road. The respective filtered share of the second longitudinal acceleration signal is taken from said frequency in order to represent the higher-frequency shares of the longitudinal acceleration in an undistorted way. It has been seen that a composite signal can be obtained by such a method which exceedingly conforms to a real longitudinal acceleration signal.

A further improvement in the precision of the conformity can be achieved in such a way that in the formation of the composite signal, the group delay times are corrected in the high-pass filter and/or low-pass filter. In this way the relative phase position of the individual frequency components can be brought into a relation as is present in the real signal.

A comprehensive evaluation of the driveability can be achieved in such a way that, in addition to the composite signal for the determination of a parameter representative of the driveability of the vehicle, at least one additional measuring variable is used from the following group: engine speed, position of throttle valve or gas pedal, vehicle speed, suction pipe vacuum, coolant temperature, ignition point, injection quantity, lambda value, exhaust gas recirculation value and exhaust gas temperature. The determination of a value for the vehicle speed is performed as described above. A correction of the higher-frequency shares is not required in this case because they are not included in the calculation of the driveability, apart from the longitudinal acceleration which is processed separately.

A particularly precise statement on the driveability can be made in such a way that the oscillation amplitude at characteristic surge frequencies is derived from the composite signal.

The invention further relates to an apparatus for the analysis of the driving behavior of motor vehicles on a roller type test stand, including a first sensor for detecting a speed signal from the power train of the motor vehicle or of the roller type test stand, an acceleration sensor for detecting the longitudinal acceleration of the motor vehicle, and an evaluation device which is connected with the first sensor and with the acceleration sensor and is arranged so as to further process the signals of the sensors and superimpose the same into a composite signal in order to calculate from the composite signal a parameter representative of the driveability of the motor vehicle. As was described above, such an apparatus provides a precise determination of the driveability on a roller type test stand.

It is particularly favorable when the acceleration sensor is disposed in the area of a neck-rest of the vehicle. It has been noticed that in this way a particularly precise conformity with the driver's perceptions is achieved, particularly when the neck-rest concerns that of the driver's seat.

As has already been described, it is advantageous when the evaluation device comprises a differentiator and a low-pass filter for the first longitudinal acceleration signal and/or a high-pass filter for the second longitudinal acceleration signal.

BRIEF DESCRIPTION OF THE DRAWINGS

The invention will now be explained in greater detail by reference to the embodiments illustrated in the drawings, wherein.

DETAILED DESCRIPTION OF THE PREFERRED EMBODIMENTS

Figure 1:
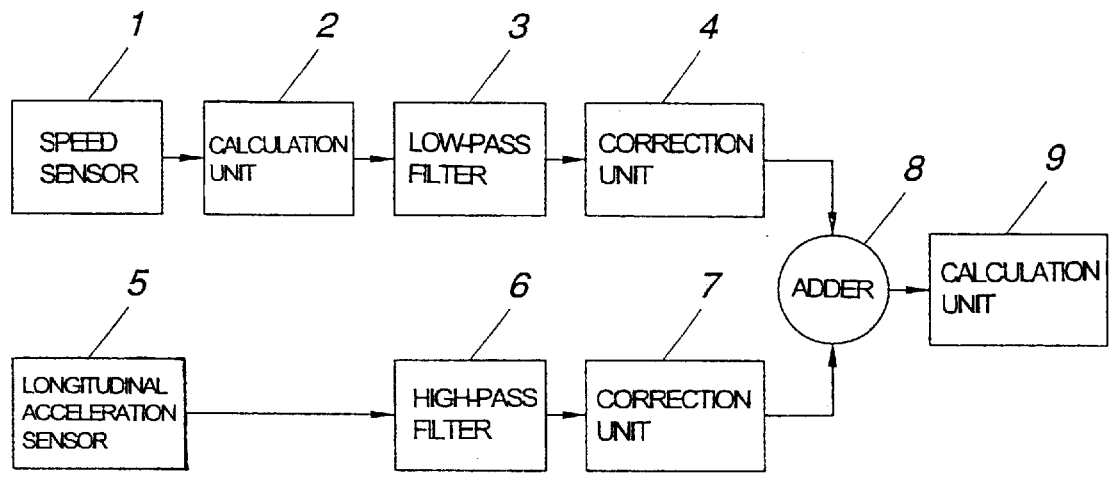
FIG. 1 shows the apparatus in accordance with the invention in a schematic diagram.

The respective engine speed is measured with the speed sensor 1. This measurement occurs in the known manner via a CAN bus. The sensor can be arranged inductively or digitally. The theoretical vehicle speed is calculated in the calculation unit 2 from the engine speed by considering the gear transmission. The theoretical acceleration is derived by differentiating the speed. The signal from the calculation unit 2 is converted in a low-pass filter 3, which concerns a digital filter of order 2 with a cut-off frequency fg of 1.5 Hz. The ripple of the filter is 3 dB. The time delay of the individual values is corrected in a correction unit 4 by the group delay time resulting from the filter.

Simultaneously, the actual longitudinal acceleration is measured by a longitudinal acceleration sensor 5, which can be arranged in the neck-rest of the vehicle for example. The signal of sensor 5 is filtered in a high-pass filter 6 which is of order 2 and comprises a cut-off frequency fg of 1 Hz. The ripple of this filter is also 3 dB. This filtered signal is also corrected in a correction unit 7 by the group delay time resulting from the filter.

The signals from the correction units 4, 7 are added in an adder 8 and supplied to a calculation unit 9 for the driveability, which will evaluate the surging for example.

Figure 2:
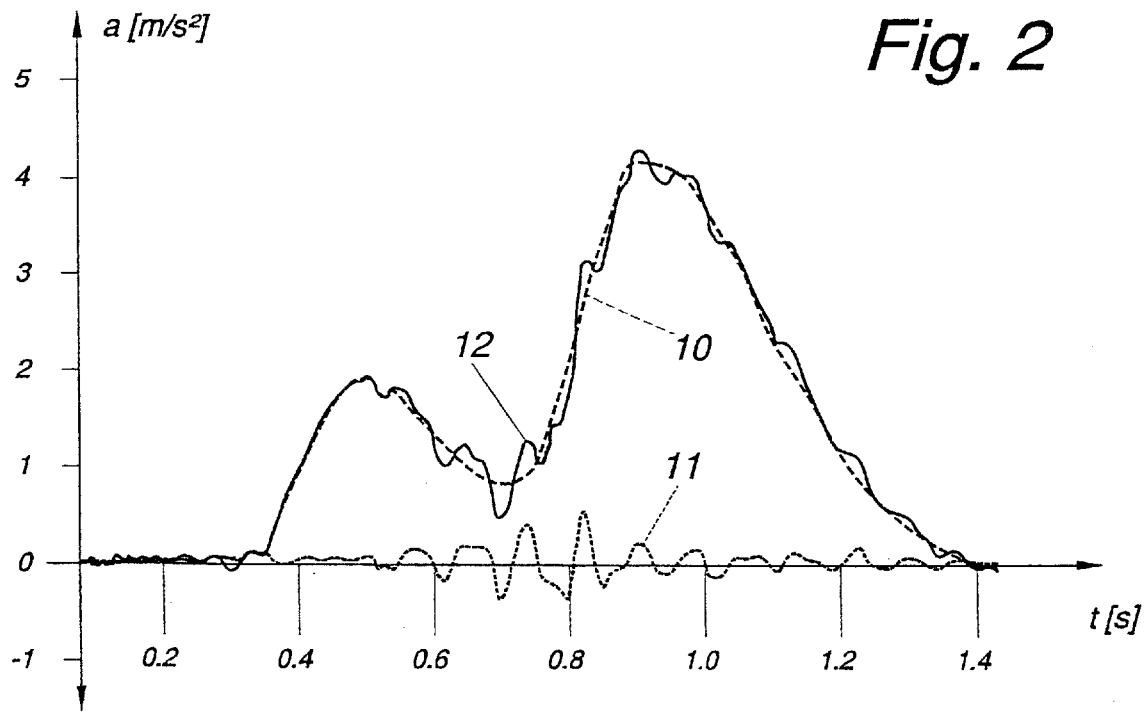
FIG. 2 shows a diagram exhibiting the superposition of the first and second longitudinal acceleration signal.

The operating mode of the circuit as explained in FIG. 1 will now be explained by reference to the diagram of FIG. 2. The respective acceleration values a are applied in a non-stationary driving state over the time axis. The first longitudinal acceleration signal is designated with reference numeral 10 which is derived from the engine speed. This signal 10 is shown with broken lines. As is shown in FIG. 2, it concerns a relatively smooth signal because the high-frequency shares were filtered out by low-pass filtering. Reference numeral 11 shows a dotted line representing the second longitudinal acceleration signal. The signal fluctuates about the time axis because the vehicle located on the roller type test stand naturally cannot be provided with any longer phases of acceleration with the same sign. This signal is also high-pass filtered.

Reference numeral 12 shows with the unbroken lines the composite signal from the first longitudinal acceleration signal 10 and the second longitudinal acceleration signal 11. The global progress of said composite signal 12 naturally follows the first longitudinal acceleration signal 10. The high-frequency shares of the second longitudinal acceleration signal 11, however, are also represented.

It has been noticed that the composite signal 12 can be used outstandingly as a basis for evaluating the driveability of a vehicle which is examined on a roller type test stand. From a qualitative standpoint the composite signal 12 corresponds to the highest possible extent to the actual longitudinal acceleration which can be measured by an longitudinal acceleration sensor 5 during the operation of a vehicle on the road. In this way it is possible to perform examinations on the driveability of the vehicle on a roller type test stand in a simplified form without impairing the quality of the results.

What is claimed is:

1. A method for determining the drivability of a motor vehicle having a power train which comprises the steps of:

positioning the motor vehicle on a roller test stand and operating the power train of the motor vehicle according to a predetermined operating cycle, determining speeds of the power train or rollers of the test stand and determining a first longitudinal acceleration signal from said speeds, determining an acceleration of the vehicle and providing a second longitudinal acceleration signal therefrom, superimposing said first and second acceleration signals to provide a composite signal, and determining a parameter representative of the drivability of the motor vehicle from said composite signal.

2. A method according to claim 1, including providing a speed signal and differentiating the speed signal to provide the first longitudinal acceleration signal.

3. A method according to claim 1, including low-pass filtering the first longitudinal acceleration signal.

4. A method according to claim 3, including low-pass filtering group delay times to provide the composite signal.

5. A method according to claim 1, including high-pass filtering the second longitudinal acceleration signal.

6. A method according to claim 3, including high-pass filtering group delay times to provide the composite signal.

7. A method according to claim 1, wherein, in addition to the composite signal, at least one additional measured variable is used from the following group for the determination of a parameter representative of the driveability of the motor vehicle; engine speed, position of throttle valve or gas pedal, vehicle speed, suction pipe vacuum, coolant temperature, ignition point, injection quantity, lambda value, exhaust gas recirculation value and exhaust gas temperature.

8. A method according to claim 1, including deriving a oscillation amplitude from the composite signal at characteristic surge frequencies.

9. An apparatus for the analysis of the drivability of a motor vehicle having a power train when the motor vehicle is positioned on a roller type test stand, including a first sensor for detecting a speed signal from the power train of the motor vehicle or the roller type test stand, an acceleration sensor for detecting the longitudinal acceleration of the motor vehicle, and an evaluation device which is connected with the first sensor and with the acceleration sensor and which is arranged so as to further process signals of the sensors and superimpose the same into a composite signal in order to calculate from said composite signal a parameter representative of the driveability of the motor vehicle.

10. An apparatus according to claim 9, wherein the acceleration sensor is attached in a zone of a neck-rest of the motor vehicle.

11. An apparatus according to claim 10, wherein the evaluation device comprises a differentiator and a low-pass filter for a first longitudinal acceleration signal derived from the speed signal and a high-pass filter for a second longitudinal acceleration signal from acceleration sensor.

* * * * *